United States Patent
Halvorsen

(10) Patent No.: US 11,941,466 B1
(45) Date of Patent: Mar. 26, 2024

(54) SYSTEM AND METHOD FOR DETERMINING WEBSITE USER IDENTITY

(71) Applicant: Roy M. Halvorsen, Ridgewood, NJ (US)

(72) Inventor: Roy M. Halvorsen, Ridgewood, NJ (US)

(*) Notice: Subject to any disclaimer, the term of this patent is extended or adjusted under 35 U.S.C. 154(b) by 0 days.

(21) Appl. No.: 17/902,820

(22) Filed: Sep. 3, 2022

(51) Int. Cl.
  *G06F 16/40* (2019.01)
  *G06F 9/54* (2006.01)
  *H04L 67/146* (2022.01)

(52) U.S. Cl.
  CPC ............ *G06F 9/547* (2013.01); *H04L 67/146* (2013.01)

(58) Field of Classification Search
  CPC ................................ G06F 9/547; H04L 67/146
  See application file for complete search history.

(56) References Cited

U.S. PATENT DOCUMENTS

| | | | | |
|---|---|---|---|---|
| 8,428,509 | B2* | 4/2013 | Watson ............... | H04L 12/1831 370/338 |
| 8,527,291 | B1* | 9/2013 | Kochendorfer ........ | G16H 70/60 705/2 |
| 2007/0239606 | A1 | 10/2007 | Eisen | |
| 2008/0021787 | A1 | 1/2008 | MacKouse | |
| 2010/0332404 | A1* | 12/2010 | Valin ..................... | G06Q 99/00 705/310 |
| 2011/0082768 | A1 | 4/2011 | Eisen | |
| 2012/0239541 | A1 | 9/2012 | Tsukahara et al. | |
| 2013/0073336 | A1* | 3/2013 | Heath ................... | G06Q 30/02 705/7.29 |
| 2013/0073388 | A1* | 3/2013 | Heath ................... | G06Q 50/01 705/14.53 |
| 2013/0332358 | A1 | 12/2013 | Zhao | |
| 2014/0032705 | A1* | 1/2014 | Williams .............. | H04W 12/08 709/217 |
| 2014/0114843 | A1 | 4/2014 | Klein et al. | |
| 2015/0111536 | A1* | 4/2015 | Sundar .................. | H04W 4/02 455/411 |
| 2021/0201250 | A1* | 7/2021 | Santosh ................ | G06Q 10/08 |
| 2022/0036413 | A1* | 2/2022 | Ketchel, III ....... | G06Q 30/0633 |
| 2022/0166621 | A1* | 5/2022 | Kairon ................ | G06Q 30/0207 |
| 2022/0383377 | A1* | 12/2022 | Ketchel, III ......... | G06Q 20/102 |

* cited by examiner

*Primary Examiner* — Kevin L Young
*Assistant Examiner* — Abdou K Seye

(57) ABSTRACT

A system of hardware and software for identifying website users, recording said users' internet behavior and displaying said users' internet behavior. More specifically, the present invention discloses a system of combining at least five separate hardware units which identify website users who have visited a specific internet site. Said system records and displays said users' internet behavior related to purchasing goods and services using a graphical interface.

5 Claims, 4 Drawing Sheets

VISITORS

| | Facility | Name | Address | City/State/Zip | Phone |
|---|---|---|---|---|---|
| 1 | Valley Hospital | John Smith | 223 Van Dien Ave | Ridgewood NJ 07450 | 201-670-1234 |
| 2 | Indiana Univsity Health | Robert Jones | 1701 Senate Blvd | Indianapolls, IN 46077 | 317-962-2000 |
| 3 | Scripps Mercy Hos. SD | Hazel Potter | 4077 5th Avenue | San Diego CA 91910 | 619-294-8111 |
| 4 | Acadia Hospital | Jesse Phial | 281 Stillwater Ave | Bangor, ME 04401 | 207-9736100 |

SYSTEM AND METHOD FOR DETERMINING WEBSITE USER IDENTITY

CROSS-REFERENCES

This is a continuation-in-part application claiming the benefit of priority to U.S. patent application Ser. No. 16/602,607 filed Nov. 6, 2019 (19 Nov. 2019) which claims priority to Ser. No. 15/731,265 filed May 15, 2017 (15 May 2017); all contents of which are hereby incorporated by reference.

BACKGROUND OF THE INVENTION

Field of the Invention

The present disclosure relates to an Internet application field, and more particularly, a system and method for determining the identity of a website user.

Background

The present invention allows an Internet content publisher to use identifiers generated by visits to their Internet (web) site to identify visitors who have visited the web sites of the Internet content publisher's clients' web sites regardless of whether said visitors disclose their identity at the time said visitor visited said Internet content publisher's clients' web sites. The information provided by the present invention is likely to provide Internet content publisher's clients with data sufficient to identify prospective client and what said client are interested in acquiring. Said data that would otherwise be lost to anonymous web surfing, without the use of the present invention.

Due to the current implementation of privacy laws by both federal and state governments, the use of data secured via the Internet may result in legal difficulties. Said privacy laws by both federal and state governments have a common element, namely if an Internet user give consent to the disclosure of data, then the collector of said data is generally immune from said legal difficulties. The present invention incorporates an electronic permission procedures for all hardware units to ensure the privacy of visitor while simulations allowing the identification of visitor for the purposes noted above. Said electronic permission procedures result in a certifiable trail of timely authorization for allow parties using the present invention. In short, the present invention allows information (concerning goods and services) which an visitor has expressed interest (as suggested by a visit to a specific web site and by viewing a specific good or service) to be known to authorized parties (i.e. those given electronic permission to know) while providing privacy protection to the visitor (since the present invention requires the Internet visitor's computer is memorialize the consent of the visitor and thereby allowing application program interfaces—without which the present invention will not be enabled).

Websites generally have anonymous users. The identity of said anonymous users may be of interest to the owners or the host of said websites for commercial exploitation or fraudulent prevention purposes.

In order to promote the commercial exploitation or fraudulent prevention of said anonymous users, it is necessary to accurately identify said anonymous users from an enormous number of potential Internet users. By and large, website users log into a website through an account and perhaps a password. Ideally, said accounts and said passwords are unique and said users do not share or lose control of said accounts and said passwords.

Therefore, ideally, a website host or website owner can directly identify each website user using his/her account and password information. However, it is common practice for said anonymous users to shield their identity by various means, such as registering multiple accounts on a same website and providing inaccurate information during the website registration process or by not registering at all.

In general, a website server records when a website user logs into a website through an account, a server usually records basic information that indicates user identity of the user via a secondary means. Said secondary means is typically associated with an IP address, a cookie, a user ID (such as an email or a mobile phone number of the user). Despite the use of register multiple accounts on a same website, these accounts may very likely be associated with a same user identity and thus all accounts are associated with a same IP address may be associated with the same website user.

However, existing technologies for website user identification have at least one or more of the following shortcomings: identifying a website user using information collected by the website which the website user uses; website accounts may be shared; and a website user may use different computers to register a plurality of accounts, resulting in a plurality of different Internet Protocol (IP) addresses. Therefore, a better process of identifying website users is desirable which surmounts the aforementioned difficulties Websites generally have anonymous users. The identity of said anonymous users may be of interest to the owners or the host of said websites for commercial exploitation or fraudulent prevention purposes.

In order to promote the commercial exploitation or fraudulent prevention of said anonymous users, it is necessary to accurately identify said anonymous users from an enormous number of potential Internet users. By and large, website users log into a website through an account and perhaps a password. Ideally, said accounts and said passwords are unique and said users do not share or lose control of said accounts and said passwords.

PRIOR ART

The following publications relate to systems and methods for determining the identification of Internet users for various purposes and teaching various methods.

| | | |
|---|---|---|
| 20070239606 | October 2007 | Eisen |
| 20080021787 | January 2008 | Mackouse |
| 20110082768 | April 2011 | Eisen |
| 20120239541 | September 2012 | Tsukahara |
| 20130332358 | December 2013 | Zhao |
| 20140114843 | April 2014 | Klein |

None of the foregoing teaches a four-computer, three-software system such as that disclosed herein. None of the prior art uses an iterative technique for identifying and graphically reporting website visitors. Additionally, said prior art teaches the use of securing information directly related to hardware to achieve visitor identification. The present invention uses software tags provided by three separate hardware elements, thus allowing a triangulation of the visitor's identity. The most significant difference is that the prior art simply provides the possible identity of the user based on hardware visited whereas the present invention identifies the current user based on two or more hardware visitations and associated behavior.

Therefore, a better process of identifying website users is desirable which surmounts the aforementioned difficulties.

SUMMARY OF THE INVENTION

The present invention is at least a four-computer, three-software system using novel iterative techniques to identify and graphically report website visitors. The graphics identify internet-related behavior rather than capturing and correlating data related to Internet identity (such as IP address). The present invention is designed to promote the collection of data associated with prequalified purchasers of medical goods and services. To promote this objective, the present invention is designed to limit users to visitors having a medical identification number. Said medical identification number is the national provider information number, or medical facility tax ID number. The present invention uses statistics to quantitatively assess the attractiveness of Internet-published content concerning medical goods and services to said visitors, who are prequalified as having interest in medical goods and services content. Said attractiveness of content may be related to products, companies, or publishers of said Internet medical goods and services content. The grading system used by the present invention relates to the statistical significance. The graphic interface picture identifies a geographical map associated with said visitors, information concerning said visitors, and an analysis of the relative attraction of said visitors to said products, said companies, and said publishers of Internet medical goods and services content. An example of such appears in FIG. 2, described below.

DESCRIPTION OF THE DRAWINGS

FIG. 2 is an exemplar of the graphical analyses of the reporting capability of the disclosed system and method. It should be noted that the content is fictitious, each visitor being assigned nos. 1 through 4, and associated with a plot-point, and one bar in each graph for illustrative purposes; while FIG. 2 depicts a map of the United States, the system is adaptable to any continent, state or locality.

DETAILED DESCRIPTION OF THE INVENTION

The current invention is indicated when a visitor interested in medical goods and services browses a publisher's website which contains content pertaining to medical goods and services. The publisher responds to said visit by sending a small JavaScript snippet, including publisher's token and visitor identifier to the visitor's computer where it is installed. The JavaScript instructs visitor's browser to transparently connect to Controller System. URL which is the control system for the present invention.

The visitor's browser receives a Controller System cookie, if doesn't already have one. At some later time, the visitor browses a client's website. When it does, the client's hardware sends a JavaScript back to the visitor's hardware. The JavaScript instructs visitor's browser to transparently connect to Controller System URL. The visitor's visit to the client's Internet site is logged in a data base.

The controlling hardware for the present invention prepares a picture of said data base symbolically representing content exchanged between said visitor, said publisher and said client due to prior Internet communications between said visitor and said publisher as well as between said visitor and said client; and allowing said publisher and said client to access said picture.

Figure 1:
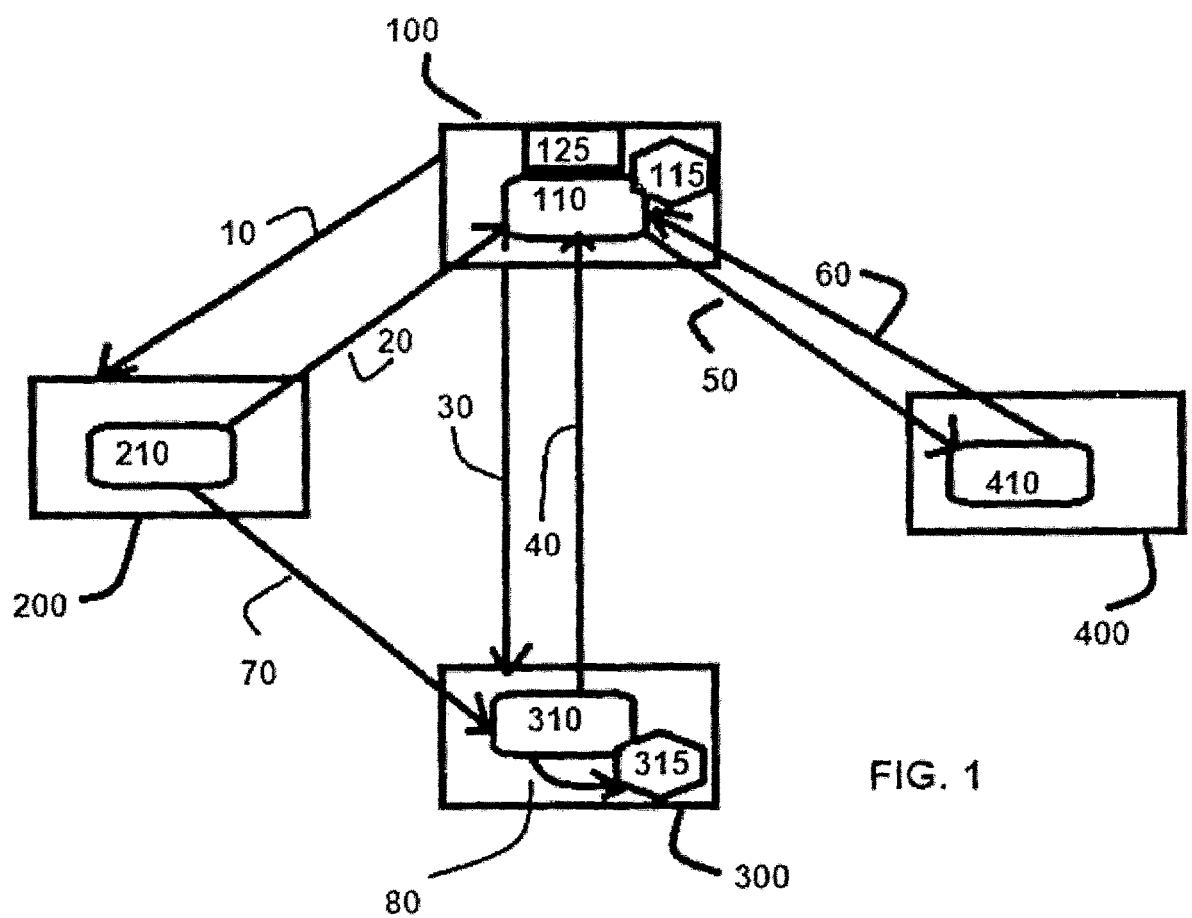
FIG. 1 is a diagram of the key elements and data flows of the current invention.

Referring now to FIG. 1, the preferred method comprises the following steps. First, install first hardware unit 100 capable of Internet communication at visitor's location. More particularly, first hardware unit 100:

Is capable of accessing the Internet;

has an identity data base software application 115;

is capable of recording, storing and transmitting information associated with the identity of said visitor stored in an identity data base 115;

is capable of recording, storing and sending information associated with the identity of the hyperlinks used by said visitor as said visitor uses said first hardware unit 100;

is capable of recording, storing and sending information to at least one other hardware unit via the Internet;

is capable of recording, storing and sending information from at least one other hardware unit via the Internet;

has authorization software 125 allowing at least one remote hardware unit to install software on said first hardware unit 100;

requires a medical identification number in order to activate said authorization software 125.

A second hardware unit 200 capable of Internet communication is installed at a publisher featuring attractive content. More particularly, said second hardware unit 200:

is located at a publisher's location having attractive content;

Said attractive content comprises content residing on the Internet which has a statistically significant probability of having hyperlinks which will be accessed by said visitor; contains references to medical goods and services; such hyperlinks being selected by market surveys of Internet users with demographical similarities to said visitor; the demographical similarities include said visitor's geographical location, occupation, industry of employment, age, gender and education level;

said second hardware unit is capable of accessing the Internet;

is capable of recording, storing and sending information to at least one other hardware unit via the Internet;

is capable of recording, storing and sending information from at least one other hardware unit via the Internet.

Attractive Content. Attractive content may be derived in a number of ways. While not a novel feature of the current invention, attractive content is a necessary element. Attractive content ensures significant numbers of visitors will go to a website and register. At a minim urn, three steps to create attractive content are identifying viewers attracted to the content, identifying the content in such a way that potential viewers can find it, and finally to populate the material with attractive content having data and information of interest to the potential attractive-content viewers. More specifically, attractive content comprises content residing on the Internet which has a statistically significant probability of having hyperlinks which will be accessed by a visitor, content containing references to medical goods and services.

Said hyperlinks are selected by market surveys of Internet users with demographical similarities to said visitor; such demographical similarities include said visitor's geographical location, More particularly, in order to increase the likelihood that an Internet visitor will initiate communication to a particular website (in this case to increase the likelihood that a visitor will use first hardware unit 100 to initiate the method of the present invention by initiating first communication 1, it is generally known to narrow the target audience for an Internet site, identify topics that are important to the visitor intended to be attracted, and said content should add value to the visitor's understanding of those topics, or that guides them to overcome challenges in the subject area.

Because there are so many ways of creating attractive content, the present invention does not teach one particular method. However, insofar as the presence of attractive content is an essential element of the present invention, a widely accepted method is taught below.

Attractive content requires viewers. Viewers that are distracted by other content will not generally view the attractive content. Preexisting content is a major inhibitory to the production of attractive content. In order to identify the demographics of a potential attractive-content viewers, one of the following techniques may be used.

The first step in creating attractive content is to identify the scope of the audience and make sure it is a niche that can support advertising. The term 'advertising' is a place-holder for any quantifiable measuring system. Using a search engine such as Google, by way of example, search "jobs that purchase more than 10 million in goods annually" and "how many people do [job x]". If one eliminates jobs with more than 25,000 people with that job title, on should thereby derive a list of manageable audiences with purchasing power.

After determining a target demographic, the next step is to determine one will be able to reach that demographic. For example, it is important to ensure that the attractive content is not overshadowed by existing communication options. In order to determine if the attractive content faces such competition, on should then search the title of existing resources which attempt to communicate with the same target demographic; another is to check Standard Rates and Data online or at a library. If five or more competitors are attempting to communicate with the target, a different demographic should be considered.

Another way to increase the likelihood of success is to search for each publication and consider eliminating markets that do not have at least three publishing outlets featuring advertising on their websites. Select one of the remaining markets. People who perform that function is the target audience.

After finding potential viewers for the attractive content, that content must be named in such a way as to be easily identifiable as attractive content to those viewers. Having used one or more of the above techniques to select an appropriate demographic, the next step is to label the attractive content and its online counterpart such that the selected target audience can identify with it and easily find its online presence. For example, naming the attractive content by combining job titles or functions with a description of the target audience into a unique name. For example, if targeting hospital administrators contracting cleaning services, the attractive content might be named "Hospital Administrator/Cleaning Service Guide" or similar combination.

It is best to check whether the online name has already been taken, such as by a Google search. If verified that the URL is available, register it online.

The final step is to become familiar with content areas that are most important to the target audience, and identify resources that will keep it in touch with its interests over time. For example, attendance at one or more professional association meetings, and speaking with thought leaders and other representatives of the target audience about what is important to them. Additional sources might include searching the target job title plus the word "Association" or "Congress" to find a professional meeting of who perform that job, and to meet with as many within the target audience as possible, or at their offices for one-on-one conversations about their interests. It is suggested to inquire whether there are at least ten exhibiting companies have upgraded convention booths (i.e., larger than the smallest), and that five have even larger booths as a way to determine whether the market will support the attractive content and continue to maintain and update it.

Still further research may be obtained by contacting presenters with high attendance to ask what topics most interest the target audience, and who are the people they would like to hear write on those topics. Map the overlap of each presenters' topics and the responses from rank and file target audience members. The top five will likely be the content attractive to the greatest number, and who will likely contribute attractive content for this application.

Once one has the compelling topics identified, interview the thought leaders for background information and ask them on the topics they identified about whom they would like to hear discuss the subject. Ask them to write or for introductions to those they would like to hear from and ask them to write. Follow up for verification of any topics identified, and edit any articles or other content that provide to ensure clarity and concision before.

A third hardware unit 300 capable of Internet communication is installed at controller. Regarding third hardware unit 300,
 is capable of accessing the Internet;
 is capable of recording, storing and sending information to at least one other hardware unit via the Internet; and
 is capable of recording, storing and sending information from at least one other hardware unit via the Internet.

A fourth hardware unit 400 capable of Internet communication is installed at a client's location. More particularly, said fourth hardware unit 400:
 is capable of accessing the Internet;
 is capable of recording, storing and sending information to at least one other hardware unit via the Internet;
 is capable of recording, storing and sending information from at least one other hardware unit via the Internet; and
 has a fourth software application.

It should be noted that software applications 210, 310, and 410 are preferably preinstalled on hardware units 200, 300, and 400, respectively. Software application 110 is installed on hardware unit 100 by an Internet communication from hardware unit 200 via software 210. Subsequently, software application 110 is modified via the Internet as a result of an Internet communication with hardware unit 300 via software application 310. Subsequent communications among hardware units 100, 200, 300, and 400 via the Internet will allow information, including modifications of remote-software applications to be rendered. More particularly, first software application 210 is installed on second hardware unit 200 to allow second hardware unit 200 using software application 210 to install second software application 110 on first hardware unit 100 at visitor's location if not already installed. More particularly, first software application 210:
- is capable of directing said second hardware unit to access identity data base content located on said first hardware unit,
- copy said identity data base content into an e-mail and send said e-mail to said second hardware unit,
- installing first software application on said second hardware unit in order to allow said second hardware to install second software on said first hardware;
- is capable of directing said second hardware unit to access identity data base content located on said first hardware unit,
- is capable of copying said identity data base content into an e-mail, and sending said e-mail to said second hardware unit; and
- is capable of communicating via the Internet with at least one software application located remotely from said first hardware unit.

Figure 2:
Figure 2:
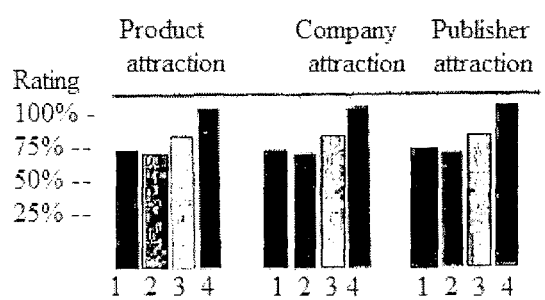

Third software application 310 is capable of:
- allowing said third software application 310 to install control access function on said second software application 210 on said first hardware unit 100;
- Said control access allows said third hardware unit 300 user to control, edit, and manipulate said second software application 110 on said first hardware unit 100,
- Dynamically creating and updating a picture maker database subroutine 315 capability residing on said third hardware as part of said third software application 310;
  - said picture maker database sub-routine 315 is capable of receiving, storing and processing input from at least one remotely located hardware unit via the Internet, and capable of producing a pictorial image such FIG. 2;
  - said pictorial interface, as produced by picture-maker database subroutine 315, comprising the steps of
    (a) generating a first display;
       wherein said first display having a first map with picture images, each said picture images indicating a specific visitor location in said first map at which a group of pictures in said picture database was captured, and each said picture icon positioned within the environment of the first map at a location that corresponds to the specific location at which the group of pictures was captured;
    (b) generating at least a second display level linked to said first display level, said second display level having a second map with greater geographical specificity than said first map with picture images, each said picture image indicating a specific location in said second map at which a group of pictures in said picture database was captured, and each said picture image positioned within the second map at a location that corresponds to the specific location at which the group of pictures was captured; and
    (c) generating an additional display level comprising digital representations of the pictures corresponding to images in said second display level,
       wherein said second display level is generated via activating a picture image in said first display level, and wherein the additional display level is generated by activating a picture image in the second display level a picture image in said first display level.

It should be noted that fourth software application 410 is preinstalled on fourth hardware unit 400. Said fourth software application 410. More particularly, fourth software application 410 is capable of communicating via the Internet with at least one software application located remotely from said fourth hardware unit 400.

The second software application 110, is capable of communicating via the Internet with at least one software application located remotely from said first hardware unit 100.

The aforementioned hardware units 100, 200, 300, and 400, and software applications 110, 210, 310, and 410 interact as follows to produce the pictorial interface as exemplified in FIG. 2. Said interaction results from a series of ordered communications:
(a) sending a first communication 10 via an Internet browser search from said first hardware unit 100 to said second hardware unit 200;
(b) sending a second communication 20 from said first software application 210 located on said second hardware unit 200 installs second software application 110 on first hardware unit 100 in response to said first communication 10 authorizing installation of said second software application 110 on said first hardware unit 100,
(c) installing said second software application 110 on said first hardware 100 upon receipt of said second communication 20; then
(d) sending a third communication 30 from said first hardware unit 100 to said third hardware unit 300 in response to said installation of said second software application 110; wherein said third communication 30 from said second software application 110 on first hardware unit 100 to said third software application 310 on said third hardware unit 300 contains a copy of said identity data base 125 content of said first hardware unit 100 via said second hardware unit 200 to picture maker database 315 sub-routine of said third software application 310 on said third hardware 310 in response to said third communication 30;
(e) sending a fourth communication 40 from said third software application 310 on said third hardware unit 300 to said first software application 110 on said second hardware unit 200 in response to receiving a copy of said identity data base 115 content of said second software application 110 on said first hardware unit 100;
(f) modifying said attractive content on said first software application 210 on said second hardware unit 200 to make said attractive content to improve the statistical probability of having hyperlinks which will be accessed by said visitor by improving the accuracy of knowledge of actual users of said attractive content;
(g) sending a fifth communication 50 from said second software application 110 on first hardware unit 100 to fourth software application 410 located on said fourth hardware unit 400, in response to communications between said first hardware unit 100 and said second hardware unit 200;
(h) sending a sixth communication 60 from said fourth software application 410 on said fourth hardware unit 400 to said second software application 110 on said first hardware unit 100 in response to said fifth communication 50; such that said sixth communication 60 allows client using said fourth software application 410 on said fourth hardware unit 400 to view said attractive content on said first software application 210 on said second hardware unit 200;
(i) passing said sixth communication 60 initiates a browser communication akin to said first message 10, causing second software application 110 to inform said first software application 210, which in turn communicates to said first software application 210, informing the receipt of said sixth communication 60;

(j) sending a seventh communication 70 from said first software application 210 on said second hardware 200 to said third software application 310 on said third hardware unit 300 in response to said sixth communication 60; such that said seventh communication 70 from said first software application 210 on said second hardware 200 to said third software application 310 on said third hardware unit 300 contains communications from and to said first software application 100 on said second hardware unit 200;

(k) recording the content of said communications from and to said first software application 210 on said second hardware 200 in said seventh communication 70 in said third software application 310 on said third hardware unit 300 to in response to said seventh communication 70;

(l) sending an eighth communication 80 from said third software application 310 to said picture maker database 315 sub-routine in response to said seventh communication 70 to update time of communications in said picture maker database 315 sub-routine;

(m) preparing a graphical user interface (such as FIG. 2) capable of browsing and retrieving website users' identity and behavior related to purchasing of medical goods and services using picture maker database 315 sub-routine (n) storing said picture (such as FIG. 2) on said third software application 310 on said third hardware unit 300;

(o) accessing said picture (such as FIG. 2) located on said third hardware unit 300 via the Internet by said controller location from said third hardware unit 300;

(p) accessing said picture (such as FIG. 2) located on said third hardware unit 300 via the Internet by a client location from said fourth hardware unit 400;

(q) accessing said picture (such as FIG. 2) located on said third hardware unit 300 via the Internet by said publisher location from said second hardware unit 200; and (r) accessing said picture (such as FIG. 2) located on said third hardware unit 300 via the Internet by said visitor location from said first hardware unit 100.

In other embodiments, the method allows website visitor identity data to be segregated by time, thus allowing pictures of visitor behavior over time to be generated. See FIG. 2 in the upper-right hand corner for examples of picture-generation capability, more particularly, such information can be generated on a last-week, last-month or last-quarter basis.

In an alternate embodiment, the picture symbolically represents content exchanged between said visitor hardware unit 100, said publisher's location on second hardware unit 200, and said client hardware unit 400.

In an alternate embodiment, the first symbolic representation is a notation of location of visitors on a map of the United States. The second symbolic representation is a set of graphs which identify the relative behavior of the visitors with respect to product attraction (the average of company attraction and publisher attraction). Company attraction is the number of visits by each visitor to hardware unit 100; publisher attraction is the number of visits by each visitor to hardware 100. This graph rates behavior based on number of visits to publisher's location on fourth hardware unit 400.

Returning now to FIG. 1, said picture is stored on third hardware unit 300. Said picture may then be accessed by a communication by publisher's location fourth hardware unit 400.

Figure 4:
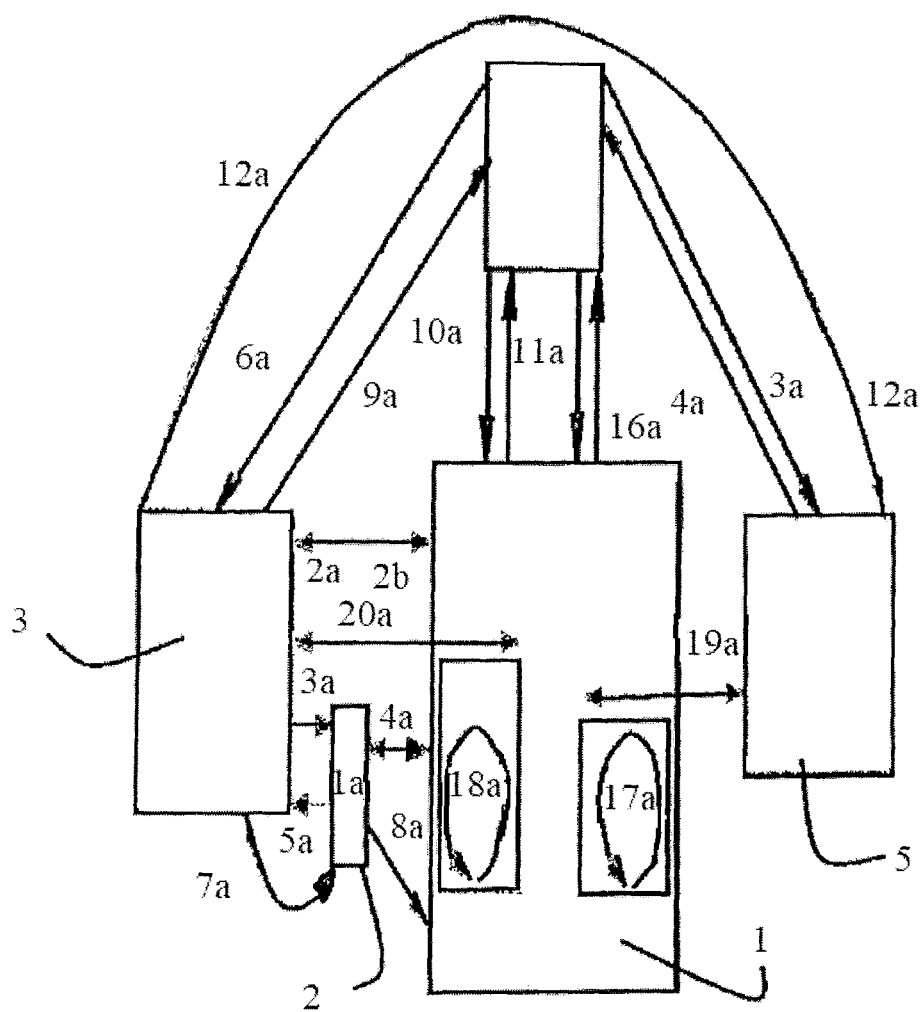
FIG. 4 is a flow diagram of another alternative embodiment of the current invention.

Now referring to FIG. 4, the present invention in an alternative embodiment involving first hardware unit (1) referred to below as TrafficID computer, second hardware unit (2) referred to below as cell phone, third hardware unit (3) referred to below as Publisher and Publisher's computer, fourth hardware unit (4) referred to below a visitor and fifth hardware unit (5) referred to below as Client wherein the following communication channels are established as follows:

1a) TrafficID computer (1) provides Publisher with a cellular activation box (cellphone) (2) and code for their website to tag visitors and develop a database of tagged visitors to be used to identify them when they visit client websites 2a) Publisher (3) provides TrafficID computer (1) with its website users database containing unique identifiers 3a) Publisher's computer (3) connects with Cellular activation box to confirm account status 4a) Cell phone (2) checks active account status with TrafficID computer (1)

5a) Cell phone (2) confirms status with Publishers computer to continue accessing the API (application program interface)

6a) Visitors (4) visit Publishers website (on 2) seeking attractive internet content that identifies them as a prospective purchaser of related goods and services (e.g, people visiting an engineering expo website to register to attend are likely prospects for engineering related goods and services because they have taken action to view category of products available).

7a) Publisher (3) provides user phone numbers batches to cell phone for confirmation inquiries 8a) Cell phone (2) sends confirmation data to TrafficID computer (1) to enhance triangulation 9a) Publisher's website instructs Visitors (4) browser to connect with TrafficID computer (1) and provide Publisher's identifier and unique user identifier. (If user information is unknown, Publisher exchanges access to internet attractive content for user information such as name, email, address, etc. during visit); alternatively, 2b if visitor (4) provides (or updates) user information, Publisher's website uses TrafficID API to connect to cell phone to verify account is active and current, and if active and current, provides new user data to TrafficID computer (1) including unique user identifier.

10a) Visitor's browser connects to TrafficID computer (1) and provides unique Publisher identifier and unique Visitor identifier 11a) If visitor's browser has no TrafficID unique identifiers, TrafficID computer (1) places unique TrafficID and other unique tags into visitors cookie and other browser caches. If a TrafficID identifier is already in place, TrafficID computer (1) links the Publishers unique user number with TrafficID identifier.

12a) Publishers (3) provide Clients (5) with website code and guide them through a process of mapping specific attractive internet content on Client's website that infer product/service interest.

13a) Client websites (Clients 5) attract Visitors by providing attractive internet content for the purpose of exchanging additional information for Visitor's user information (name, email, address, affiliation, etc.).

14a) Website code on Client's website instructs Visitors browser to connect with TrafficID computer (1) and provides TrafficID computer (1) with Client's unique Identifier and reference URL 15a) Visitors (4) browser connects with TrafficID computer (1) providing Clients unique identifier and reference URL 16a) TrafficID computer (1) identifies the Visitor's tag or installs a unique Visitor tag for later identification 17a) TrafficID computer (1) records the visit (IP address, URL, tag number, client) and links the visit to publisher and client accounts.

18a) TrafficID computer (1) links the data to Identify the Visitor at. Client's website.

19a) Client (5) accesses TrafficID computer (1) to retrieve reports of who is visiting their site 20a) Publisher (3) accesses TrafficID interface to access client and publisher reports of who is visiting Publisher (3) and Client (5) sites.

Figure 3:
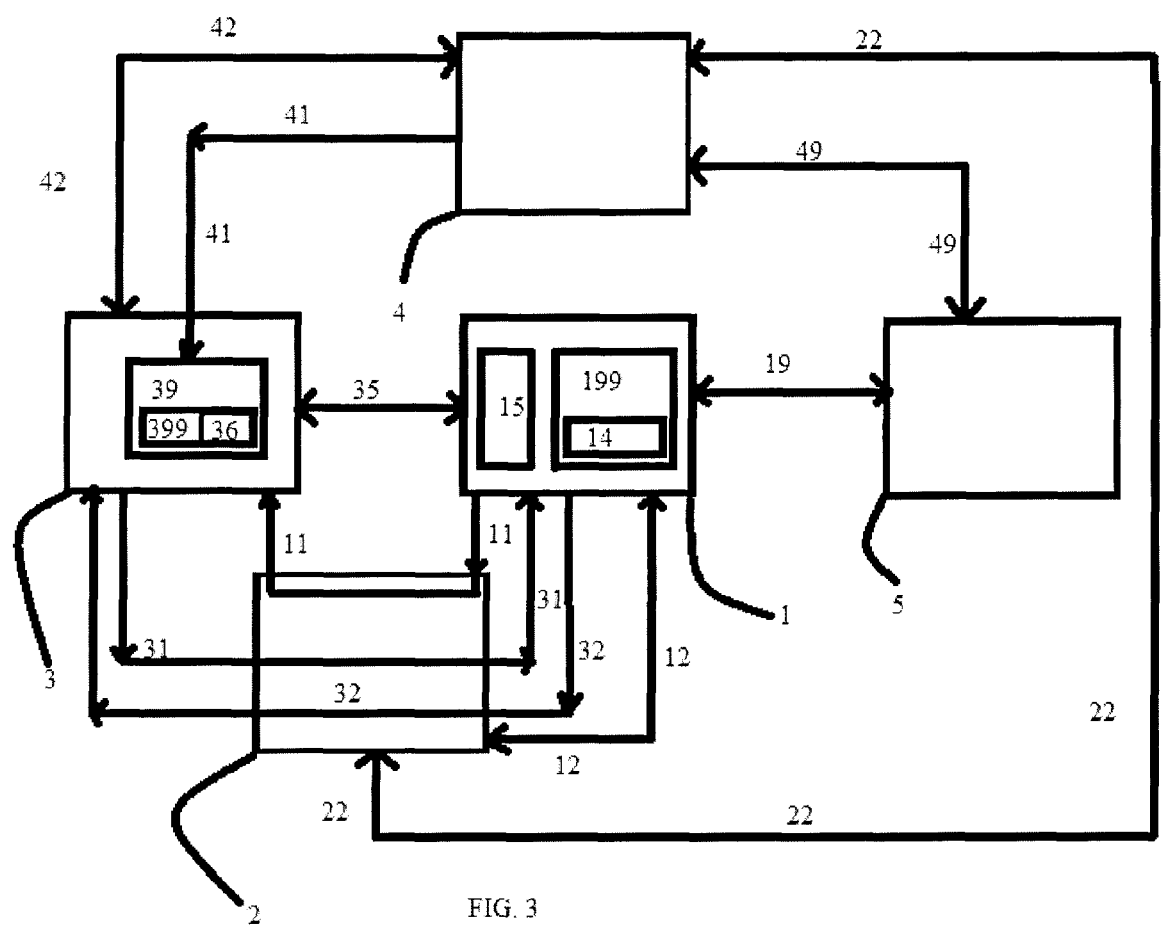
FIG. 3 is a flow diagram of a five-unit implementation of the current invention, having one mobile and four immobile hardware units of an embodiment of the present invention, including the communications therebetween.

Now referring to FIG. 3, in still another alternative embodiment, wherein the fifth hardware unit (5) has a web site and cookies are delivered to fourth hardware unit (4) when fourth hardware unit (4) visits fifth hardware unit (5). More particularly, a system of hardware and software elements is disclosed that directs the preparation and operation of a graphical interface for retrieving website users' identities, and records their behavior related to purchases of medical goods and services via the Internet. The system comprises the following five main hardware elements, one of which is mobile, four of which are immobile.

There is an immobile, first hardware unit (1) acting as Traffic Control Unit 1.

The second hardware unit (2) is a mobile phone, preferably a smartphone, or similar mobile device.

A third hardware unit (3) is disclosed which is housed at a publisher's location and is immobile. A publisher is source of content for a sought-after products and services such as medical products, medical services, medical expo information.

A fourth hardware unit (4) is housed at a visitor's location and is also immobile. The visitor is a content consumer and product prospect. Typically, the visitor searches using the internet and navigates to the publisher's hardware unit (3) to become more aware of content for a sought-after service such as medical products, medical services, medical expo information.

Immobile fifth hardware unit (5) is further disclosed. This device is disposed at the site of the publisher's client. The publisher's client is the producer of the content for the aforesaid, sought-after service such as medical product and other information.

The operation of this system of mobile and immobile units is described as follows.

The immobile first hardware or Traffic Control Unit (1) and configured to generate at least one identification code number (14), also known as a Traffic ID, and store at least one identification code number (14) in an identification code number data base (199), then send an activation message (11) that includes at least one identification code number (14) to a second hardware unit (2).

Mobile phone (2) must be configured to access the internet. Mobile phone (2) must also establish application program interfaces with immobile hardware units, execute software which identifies the internet addresses of said immobile hardware units; execute software which associates internet addresses of the immobile hardware units with the physical address of the immobile hardware units. Further, mobile phone (14) receives a status request message (31) from said second hardware unit (2), then processes the status request messages (31) by accessing an identification code numbers data base (199), which are the Traffic ID numbers generated and sent by the first hardware unit to the second hardware unit (20).

The first hardware unit (1) then sends a status confirmation message (32) to the second hardware unit/mobile phone (2). The status confirmation message (32) contains the first hardware unit's (1) internet hardware addresses and information to establish an application program interface and a first application program interface (35) with a third hardware unit (3).

The first hardware unit (1) establishes a second application program interface (42) with the fourth hardware unit (4), and a third application program interface (12) with the immobile, second hardware unit (2). It then directs the second hardware unit (2) to establish a fourth application program interface (22) with the fourth hardware unit (4).

The first hardware unit (1) prepares at least one data base (15) with at least one data unit. This at least one data unit includes:

i. at least one identification code number (14);
ii. at least one product number (36);
iii. said fourth hardware unit (4) at visitor's location internet address; and
iv. said fourth hardware unit (4) at visitor's location physical address.

First hardware unit (1) prepares at least one graphic representation of the at least one data base (15). It receives requests for the at least one data base (15) from the third hardware unit (3) via the first application program interface (35).

First hardware unit (1) sends a copy of the at least one data base (15) to the third hardware unit (3) via the first application program interface (35) noted above. It repeats this for a copy of said at least one graphic from the at least one data base (15) to the third hardware unit (3) also using said first application program interface (35).

First hardware unit (1) establishes a fifth application program interface (19) the fifth hardware unit (5), and sends the fifth hardware unit (5) a copy of at least one graphic from the at least one data base (15) to said fifth hardware unit (5) via said fifth application program interface (19).

The mobile phone (2) (second hardware unit) located at a publisher's location is configured to receive activation messages (11) including said identification code numbers (14) from the first hardware/Traffic Control unit (1). Activation messages (11) include at least one identification code number (14) that is sent to third hardware unit (3) to a publisher's location (3).

Second hardware unit (2) receives status request messages (31) generated and sent by the third hardware unit (3). It sends status request messages (31) to the first hardware unit (1) and also receives status confirmation messages (32) from first hardware unit (1), which messages (32) it sends to the third hardware unit (3). It allows the third application program interface (12) to communicate with the first hardware unit (1), and establishes the fourth application program interface (22) with said fourth hardware unit (4).

Mobile phone (2) confirms that the fourth hardware unit (4) is storing at least one identification code number (14) via a fourth application program interface (22) inquiry. Hardware unit (2) requests that the fourth hardware unit (4) sends internet location address to the second hardware unit (2) via a fourth application program interface (22), then transmits a confirmation message to the first hardware unit (1) using fourth application program interface (22) confirming said fourth hardware unit (4) is storing least one identification code number (14).

Mobile phone (2) confirms copies at least one internet cookie (399) incorporating at least one identification code number (14) from the third hardware unit (3), then sends the at least one internet cookie (399) to the fourth hardware unit (4) to place the cookie incorporating on the fourth hardware unit (4).

The third hardware unit (3) received the activation messages (11) including the identification code numbers (14) from the second hardware unit (2).

Further, the third hardware unit (3) hosts a web site (39). Web site (39) maintains at least one medical product having a product identifier number (36) that is based on the U.S. Patent and Trademark Office's official classification system of goods and services in accordance with the Office's ID manual.

Third hardware unit (3) prepares at least one internet cookie (399). Cookie (399) wherein said at least one internet cookie (399) is configured to incorporate the identification code numbers (14) and store it or them on web site (39) within unit (3).

Third hardware unit (3) generate status request message (31). It sends status messages requests (31) to the mobile phone/second hardware unit (2), and receives confirmation status messages (32) back from mobile phone (2).

Third hardware unit (3) further establishes the second program application interface (35) with the first hardware unit (1); allows the fourth hardware unit (4) at a visitor's location to access web site (39), and sends at least internet cookie (399) to the fourth hardware unit (4).

Third hardware unit (3) directs that the first program application interface (35) transmit all data communicated via the second program application interface (42) to the first hardware unit (1) including
i. at least one identification code number (14); and
ii. at least one medical product with a product identifier number (36) each time the second program application interface (42) accesses at least one medical product on the third hardware unit (3).

The third hardware unit (3) sends payment to the first hardware unit (1) using the first application program interface (35).

The fourth hardware unit (4) at the visitor's location is configured to, and does perform the following functions. It
  i. accesses web site (39) located on the third hardware unit (3);
  ii. establishes the second program application interface (42) with third hardware unit (3);
  iii. accepts placement of at least one internet cookie (399) incorporating at least one identification code number (14) via the second program application interface (22);
  iv. directs program application interface (42) to communicate the following to the third hardware unit (3);
    1. at least one identification code number (14); and
    2. at least one medical product having a product number (36);
    3. each time said second program application interface accesses at least one medical product on said third hardware unit (3);
  v. sends the internet address obtained from the fourth hardware unit (4) to mobile phone (2) via application program interface (22); and
  vi. establishes a fourth application program interface (49) with a fifth hardware unit (5), described next The fifth hardware unit (5) is disposed at the location of a publisher's client. The publisher's client is the ultimate beneficiary to whose attention the disclosed system seeks to call the aforementioned, sought-after products and services, using the following elements.

Fifth hardware unit (5) allows the first hardware unit (1) to establish the fourth application program interface (19). Unit (5) sends the request for transmittal of at least one data base (15) using the fourth application program interface (19).

Fifth hardware unit (5) allows the fourth application program interface (49) to establish a connection with the fourth hardware unit (4), the send the internet address for fifth hardware unit (5) to the fourth hardware unit (4) via the fourth application program interface (49) using the fourth hardware unit (4); and allow the fifth application program interface (19) establishment with the first hardware unit (1).

In a further embodiment, again referring to FIG. 3, the application program interface (22) connects said first hardware unit (1) to said fourth hardware unit (4) rather than having application interface (22) connect said second hardware unit (2) to said fourth hardware unit (4).

In a still further embodiment, also referring to FIG. 3, said fifth hardware unit (5) would incorporate a website (not shown). The website would be configured to have all the capabilities of said third hardware unit (3). Such a configuration allows the user of the present invention to collect data through a second internet site. Additionally, if such a configuration is employed, then the user would have additional confirmation of the validity of the data collected by the present invention.

Again referring to FIG. 3, in yet another embodiment, the present invention may be employed using the hardware disclosed in claim 1 and operate via an alternative method, namely when said fourth hardware unit (4) contacts said third hardware unit (3), then said third hardware unit (3) instructs the fourth hardware unit (4) to get an internet cookie from said first hardware unit (1). Upon receipt of said request, said first hardware unit (1) sends an internet cookie to said fourth hardware unit (4). The cookies would be configured to send and receive the same information as disclosed in claim 1.

In yet another embodiment of the present invention, referring again to FIG. 3, the single mobile phone implementation of second hardware unit (2) may incorporate two or more mobile phones, each configured to replicate the features and functionality of said second hardware unit (2). This allows the user of the present invention to multi-process by distributing said mobile phones a grouping of users of the present invention concurrently. Said plurality of mobile phones could be configured to act concurrently or allow a single mobile phone to interact with the invention at a particular time. The set of mobile phones could be configured to allow a hierarchy of authorization. For example, one set of mobile phones could be configured to direct their communications to a single phone configured to authorize input from said plurality thus allowing managerial control of the cellular activation device.

For any embodiment, a further option is the addition of a system for payment collected via Internet credit card transactions.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the described invention, exemplary methods and materials have been described. All publications mentioned herein are incorporated herein by reference to disclose and described the methods and/or materials in connection with which the publications are cited.

It must be noted that as used herein and in the appended claims, the singular forms "a", "and", and "the" include plural references unless the context clearly dictates otherwise.

Any publications discussed herein are provided solely for their disclosure prior to the filing date of the present application and each is incorporated by reference in its entirety. Nothing herein is to be construed as an admission that the described invention is not entitled to antedate such publication by virtue of prior invention. Further, the dates of publication provided may be different from the actual publication dates which may need to be independently confirmed.

While the described invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the described invention. All such modifications are intended to be within the scope of the claims appended hereto.

What is claimed is:

1. A system of hardware and software elements directed to preparation and operation of a graphical interface for retrieving website users' identities and recording website users' behavior related to online purchasing of medical goods and services, comprising the following elements:
   a. a first hardware unit configured to
      i. generate at least one identification code number;
      ii. store said at least one identification code number in an identification code number data base;
      iii. send an activation message which includes said at least one identification code number to a second hardware unit;
         1. wherein said second hardware unit is a mobile phone;
         2. wherein said mobile phone is configured for internet access;
      iv. establish application program interfaces with immobile hardware units;
      v. execute software which identifies an internet address for each of said immobile hardware units;
      vi. execute software associating said internet addresses of each of said immobile hardware units with physical address for each of said immobile hardware units;
      vii. receive a status request message from said second hardware unit;
      viii. process said status request message by accessing said identification code number data base and confirming the identification code numbers generated by said first hardware unit and sent to said second hardware unit;
      ix. send a status confirmation message to said second hardware unit;
         wherein said status confirmation message contains a first hardware unit internet address to establish an application program interface;
      x. establish a first application program interface with a third hardware unit;
      xi. establish a second application program interface with a fourth hardware unit at a visitor's location;
      xii. establish a third application program interface with said second hardware unit;
      xiii. direct said second hardware unit to establish a fourth application program interface with said fourth hardware unit;
      xiv. prepare at least one data base with at least one data unit;
         wherein said at least one data unit includes
            i. at least one identification code number;
            ii. at least one product number;
            iii. an internet address for said visitor's location at said fourth hardware unit; and
            iv. a physical address for said visitor's location at said fourth hardware unit;
      xv. prepare at least one graphic representation of said at least one data base;
      xvi. receive request for at least said least one data base from said third hardware unit via said first application program interface;
      xvii. send copy of said at least one data base to said third hardware unit via said first application program interface;
      xviii. send copy of said at least one graphic of said at least one data base to said third hardware unit via said first application program interface;
      xix. establish a fifth application program interface with a fifth hardware unit;
      xx. send copy of said at least one graphic of said at least one data base to said fifth hardware unit via said fifth application program interface;
   b. said second hardware unit located at a publisher's location is configured to
      i. receive said activation messages including said identification code numbers from said first hardware unit;
      ii. send said activation messages including said at least one identification code number to said third hardware unit at said publisher's location;
      iii. receive said status request message generated on said third hardware unit;
      iv. send said status request message to said first hardware unit;
      v. receive said status confirmation message from said first hardware unit;
      vi. send said status confirmation message to said third hardware unit;
      vii. allow said third application program interface with said first hardware unit;
      viii. establish said fourth application program interface with said fourth hardware unit;
      ix. confirm said fourth hardware unit is storing said at least one identification code number in said fourth hardware unit via said fourth application program interface inquiry;
      x. request said fourth hardware unit to send said fourth hardware unit internet address to said second hardware unit via said fourth application program interface;
      xi. send confirmation message to said first hardware unit using said fourth application program interface confirming said fourth hardware unit is storing said at least one identification code number;
      xii. copy at least one internet cookie from said third hardware unit;
      xiii. send said at least one internet cookie to said fourth hardware unit;

xiv. place said at least one internet cookie incorporating said at least one identification code number on said fourth hardware unit;
c. said third hardware unit at said publisher's location is configured to
  i. receive said activation messages including said at least one identification code number from said second hardware unit;
  ii. host a web site;
    wherein said web site is configured to
      maintain at least one medical product with one of said at least one product number;
  iii. prepare said at least one internet cookie;
    wherein said at least one internet cookie is configured to
      a. incorporating said at least one identification code number and
      b. storing on said web site located on said third hardware unit;
  iv. generate said status request message;
  v. send said status messages request to said second hardware unit;
  vi. receive said confirmation status messages from said second hardware unit;
  vii. establish said second program application interface with said first hardware unit;
  viii. allow said fourth hardware unit to access said web site;
  ix. sending said at least internet cookie to said fourth hardware unit;
  x. direct said first program application interface to transmit all data communicated via said second program application interface to said first hardware unit including
    1. said least one identification code number; and
    2. said at least one medical product with said at least one product number each time said second program application interface accesses said at least one medical product on said third hardware unit;
  xi. send payment to said first hardware unit using said first application program interface;
d. said fourth hardware unit is configured to
  i. access said web site located on said third hardware unit;
  ii. establish said second program application interface with said third hardware unit;
  iii. accept placement of said at least one internet cookie incorporating said at least one identification code number via said second program application interface;
  iv. direct said program application interface to communicate to said third hardware unit;
    1. said least one identification code number; and
    2. said at least one medical product with said at least one product number;
    3. each time said second program application interface accesses said at least one medical product on said third hardware unit;
  v. send said fourth hardware unit internet address to said fourth hardware unit via said application program interface with said fourth hardware unit;
  vi. establish said fourth application program interface with said fifth hardware unit at a client location;
e. Said fifth hardware unit is configured to
  i. allow said first hardware unit to establish said fourth application program interface;
  ii. send request for transmittal of said at least one data base using said fourth application program interface;
  iii. allow said fourth application program interface establishment with said fourth hardware unit;
  iv. send said fifth hardware unit internet address to said fourth hardware unit via said fourth application program interface with said fourth hardware unit; and
  v. allow said fifth application program interface establishment with said first hardware unit.

2. The system of claim 1, wherein said application program interface connects said first hardware unit to said fourth hardware unit.

3. The system of claim 1, wherein said second hardware unit comprises at least two mobile phones.

4. The system of claim 1, wherein said fifth hardware unit further comprises a second website adapted to collect data from a second internet site.

5. The system of claim 1, further comprising a payment collection system.

* * * * *